(12) United States Patent
Bent et al.

(10) Patent No.: US 9,767,107 B1
(45) Date of Patent: Sep. 19, 2017

(54) PARALLEL FILE SYSTEM WITH METADATA DISTRIBUTED ACROSS PARTITIONED KEY-VALUE STORE

(71) Applicant: EMC IP Holding Company LLC, Hopkinton, MA (US)

(72) Inventors: John M. Bent, Los Alamos, NM (US); Sorin Faibish, Newton, MA (US); Gary Grider, Los Alamos, NM (US); Aaron Torres, Los Alamos, NM (US)

(73) Assignees: EMC IP Holding Company LLC, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 296 days.

(21) Appl. No.: 13/931,832

(22) Filed: Jun. 29, 2013

(51) Int. Cl.
G06F 17/30 (2006.01)

(52) U.S. Cl.
CPC .............................. *G06F 17/30094* (2013.01)

(58) Field of Classification Search
CPC ......... G06F 17/30182; G06F 17/30194; G06F 17/30224; G06F 17/30091; G06F 17/30094
See application file for complete search history.

(56) References Cited

U.S. PATENT DOCUMENTS

| | | | | |
|---|---|---|---|---|
| 5,960,434 A | * | 9/1999 | Schimmel | ......... G06F 17/30949 707/E17.036 |
| 2002/0091751 A1 | * | 7/2002 | Sonoda et al. | ................. 709/201 |
| 2006/0090163 A1 | * | 4/2006 | Karisson et al. | ............. 718/105 |
| 2006/0101025 A1 | * | 5/2006 | Tichy et al. | ................... 707/100 |
| 2008/0120435 A1 | * | 5/2008 | Moreira et al. | .................... 710/1 |
| 2011/0296422 A1 | * | 12/2011 | Hildebrand et al. | .......... 718/102 |
| 2013/0024644 A1 | * | 1/2013 | Givargis | ............... G06F 3/0665 711/E12.016 |

OTHER PUBLICATIONS

Nunez, James, "Multi-Dimensional Hashed Indexed Metadata/Middleware (MDHIM) Project," May 10, 2012, Los Alamos National Laboratory.*

(Continued)

*Primary Examiner* — Ashish K Thomas
*Assistant Examiner* — Jedidiah Ferrer
(74) *Attorney, Agent, or Firm* — Ryan, Mason & Lewis, LLP

(57) ABSTRACT

Improved techniques are provided for storing metadata associated with a plurality of sub-files associated with a single shared file in a parallel file system. The shared file is generated by a plurality of applications executing on a plurality of compute nodes. A compute node implements a Parallel Log Structured File System (PLFS) library to store at least one portion of the shared file generated by an application executing on the compute node and metadata for the at least one portion of the shared file on one or more object storage servers. The compute node is also configured to implement a partitioned data store for storing a partition of the metadata for the shared file, wherein the partitioned data store communicates with partitioned data stores on other compute nodes using a message passing interface. The partitioned data store can be implemented, for example, using Multidimensional Data Hashing Indexing Middleware (MDHIM).

25 Claims, 6 Drawing Sheets

(56) References Cited

OTHER PUBLICATIONS

Foster, Ian, et. al., "Double Standards: Bringing Task Parallelism to HPF Via the Message Passing Interface," 1996, Proceedings of the 1996 ACM/IEEE Conference on Supercomputing.*

Isaila, Florin, and Walter F. Tichy, "Mapping Functions and Data Redistribution for Parallel Files," Jan. 31, 2008, Institute for Program Structures and Data Organization at the Karlsruhe Institute of Technology, pp. 213-236.*

Cluster File Systems, Inc., "Lustre: A Scalable, High-Performance File System," Nov. 2002, pp. 1-13.*

Goodell, "An Evolutionary Path to Object Storage Access," Nov. 16, 2012; High Performance Computing, Networking, Storage and Analysis (SCC), 2012 SC Companion; pp. 36-41 (1-6).*

Wright, "Parallel File System Analysis Through Application I/O Tracing," May 24, 2012; Oxford University Press; pp. 141-155.*

Nunez, James, "Multi-Dimensional Hashed Indexed Metadata/Middleware (MDHIM) Project", Los Alamos National Laboratory, May 10, 2012.

* cited by examiner

```
PLFS open/create
    Create Index Containers
        MDHIM open/create
    Create LogData Containers
PLFS write offset, length
    Append to LogData Container
    MDHIM insert offsets/length/LogData Container
PLFS close
    MDHIM flush close
    Close LogData Container
PLFS open
    MDHIM open distribute
PLFS read offset, length
    MDHIM stab query offset
    Open appropriate LogData Container
    Read LogData
    MDHIM get next offset
    Open appropriate LogData Container
    Read Log Data
PLFS close
    MDHIM close
    Close LogData Container
```

FIG. 4

```
plfs_open_read(char *file) {

// perform conventional plfs operations such as ensuring file exists
    // with appropriate permissions // initialize MDHIM and have MDHIM read in its data logs which contain
    // the plfs metadata that plfs stored into MDHIM when the file was written
    mdhim_init();
    mdhim_read();
}
```

FIG. 5

```
plfs_open_write(char *file) {

// perform conventional plfs operations such as create top level container

// initialize MDHIM
    mdhim_init();
}
```

FIG. 6

```
Plfs_read(off_t off, len_t len, char *buffer) {

// similar to conventional plfs read, using
    // MDHIM instead of the existing plfs index to build
    // the set of readTasks // need a new implementation of
    // find_read_tasks.

```
                                                                    ┌─ 700
┌─────────────────────────────────────────────────────────────────┐
│ Find_read_tasks(off_t off, len_t len, char *buffer) {           │
│                                                                  │
│     set<read_tasks> tasks;                                       │
│                                                                  │
│     last_offset = off + len;                                     │
│     bytes_found = 0;                                             │
│     bytes_needed = off + len;                                    │
│                                                                  │
│     // first get MDHIM iterator. Back it up if necessary         │
│     mdhim_iterator = mdhim_query(off);                           │
│     if mdhim_iterator.offset > offset then mdhim_iterator--;     │
│     while(bytes_needed) {                                        │
│             // turn the iterator into a task                     │
│             //                                                   │
│             task = iterator_to_task(mdhim_iterator);             │
│             bytes_needed -= task.len;                            │
│             mdhim_iterator++; // move to next index entry        │
│     }                                                            │
│                                                                  │
│     return tasks;                                                │
│ }                                                                │
└─────────────────────────────────────────────────────────────────┘
```

FIG. 8

```
Plfs_write(off_t off, len_t len, char *buf) {

// similar to conventional write function
    // do data log
    // make an index entry
    index_entry = make_entry(off, len);

// but then instead of writing index entry to indexlog do this:
    mdhim_insert( key=off, value=index_entry);
}
```

FIG. 9

```
Plfs_close(off_t off, len_t len, char *buf, read_write_mode rw) {

// similar to conventional close function, but instead of synching and
    // closing the indexlog, call mdhim_flush
    if (rw == WRITE) mdhim_flush(); // save the MDHIM data to storage
    mdhim_finalize(); // clean up after itself
}
```

… # PARALLEL FILE SYSTEM WITH METADATA DISTRIBUTED ACROSS PARTITIONED KEY-VALUE STORE

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The field relates generally to data storage and more particularly to parallel file systems and other types of cluster file systems.

BACKGROUND

Parallel storage systems are widely used in many computing environments. Parallel storage systems provide high degrees of concurrency in which many distributed processes within a parallel application simultaneously access a shared file namespace. Parallel computing techniques are used in many industries and applications for implementing computationally intensive models or simulations.

In many parallel computing applications, a group of distributed processes must often write data to a shared file. When multiple processes attempt to write data to a shared file concurrently, however, the performance of the parallel storage system will be impaired. Serialization can cause significant performance degradation as the parallel processes must remain idle while they wait for one another. Serialization is incurred when the parallel file system locks a shared file in order to maintain the consistency of the shared file.

A number of techniques have been proposed or suggested to organize the data streams when multiple processes simultaneously save data to a shared file. For example, each process can create a single file across a set of different directories and then sequentially write a large amount of data to the single file. In a further implementation, a single process (often referred to as a "leader") can create a shared file, and then all the processes write to the shared file in segments that are aligned with block boundaries within the parallel file system.

Parallel Log Structured File System (PLFS) is a virtual log-structured file system that allows data to be written quickly into parallel file systems. PLFS is particularly useful when multiple applications write concurrently to a shared file in a parallel file system. Generally, PLFS improves write performance in this context by rearranging the IO (Input/Output) operations from being write operations to a single file to being write operations to a set of sub-files. Metadata is created for each sub-file to indicate where the data is stored. The metadata is resolved when the shared file is read. One challenge, however, is that the amount of metadata required to be read data back can be extremely large. Each reading process must read all of the metadata that was created by all of the writing processes. Thus, all of the reading processes are required to redundantly store the same large amount of metadata in a memory cache.

A need therefore exists for improved techniques for storing metadata associated with sub-files from a single shared file in a parallel file system.

SUMMARY

Embodiments of the present invention provide improved techniques for storing metadata associated with a plurality of sub-files associated with a single shared file in a parallel file system. The shared file is generated by a plurality of applications executing on a plurality of compute nodes in the parallel file system. In one embodiment, a compute node in the parallel file system is configured to implement a Parallel Log Structured File System (PLFS) library to store at least one portion of the shared file generated by an application executing on the compute node and metadata for the at least one portion of the shared file on one or more object storage servers. The compute node is also configured to implement a partitioned data store for storing a partition of the metadata for the shared file, wherein the partitioned data store communicates with partitioned data stores on the other compute nodes using a message passing interface. In this manner, the metadata for the shared file is sharded across the partitioned data store.

The partitioned data store is configured to process one or more metadata requests when one or more of the plurality of applications executing on the compute nodes performs a read or write operation on the shared file. The partitioned data store can be implemented, for example, using Multidimensional Data Hashing Indexing Middleware (MDHIM). One or more MDHIM clients run on each of the compute nodes and communicate with a plurality of MDHIM servers in the parallel file system. Each of the MDHIM servers store a partition of the metadata for the shared file comprising a sub-range of a key space for the metadata for the shared file. A given MDHIM server storing a particular sub-range of the metadata is contacted to read or write metadata within the sub-range.

Advantageously, illustrative embodiments of the invention write data from a group of distributed processes to a shared file using a parallel log-structured file system. Metadata processing operations in accordance with aspects of the present invention reduce data processing and transfer bandwidth costs and preserve valuable disk space.

These and other features and advantages of the present invention will become more readily apparent from the accompanying drawings and the following detailed description.

BRIEF DESCRIPTION OF THE DRAWINGS

FIGS. 3 through 9 illustrate exemplary pseudo code for the interactions between the PLFS library and Multidimensional Data Hashing Indexing Middleware (MDHIM) of FIG. 2.

DETAILED DESCRIPTION

Illustrative embodiments of the present invention will be described herein with reference to exemplary parallel file systems and associated clients, servers, storage arrays and other processing devices. It is to be appreciated, however, that the invention is not restricted to use with the particular illustrative parallel file system and device configurations shown. Accordingly, the term "parallel file system" as used herein is intended to be broadly construed, so as to encompass, for example, distributed file systems, cluster file systems, and other types of file systems implemented using one or more clusters of processing devices.

As indicated above, one challenge in a parallel file system when a plurality of distributed processes write to a shared file, is the amount of metadata that must be stored and processed. According to one aspect of the present invention, a partitioned key-value store is used coupled with low-latency Message Passing Interface (MPI) communications, distributed across the user-space of compute nodes, to cooperatively store the PLFS metadata. While the present invention is illustrated in the context of a PLFS file system, the present invention can be employed in any file system that employs extensive data mapping metadata. In addition, while the exemplary embodiments of the present invention employ Multidimensional Data Hashing Indexing Middleware (MDHIM), other MPI-Linked partitioned data stores can be employed, as would be apparent to a person of ordinary skill in the art.

Figure 1:
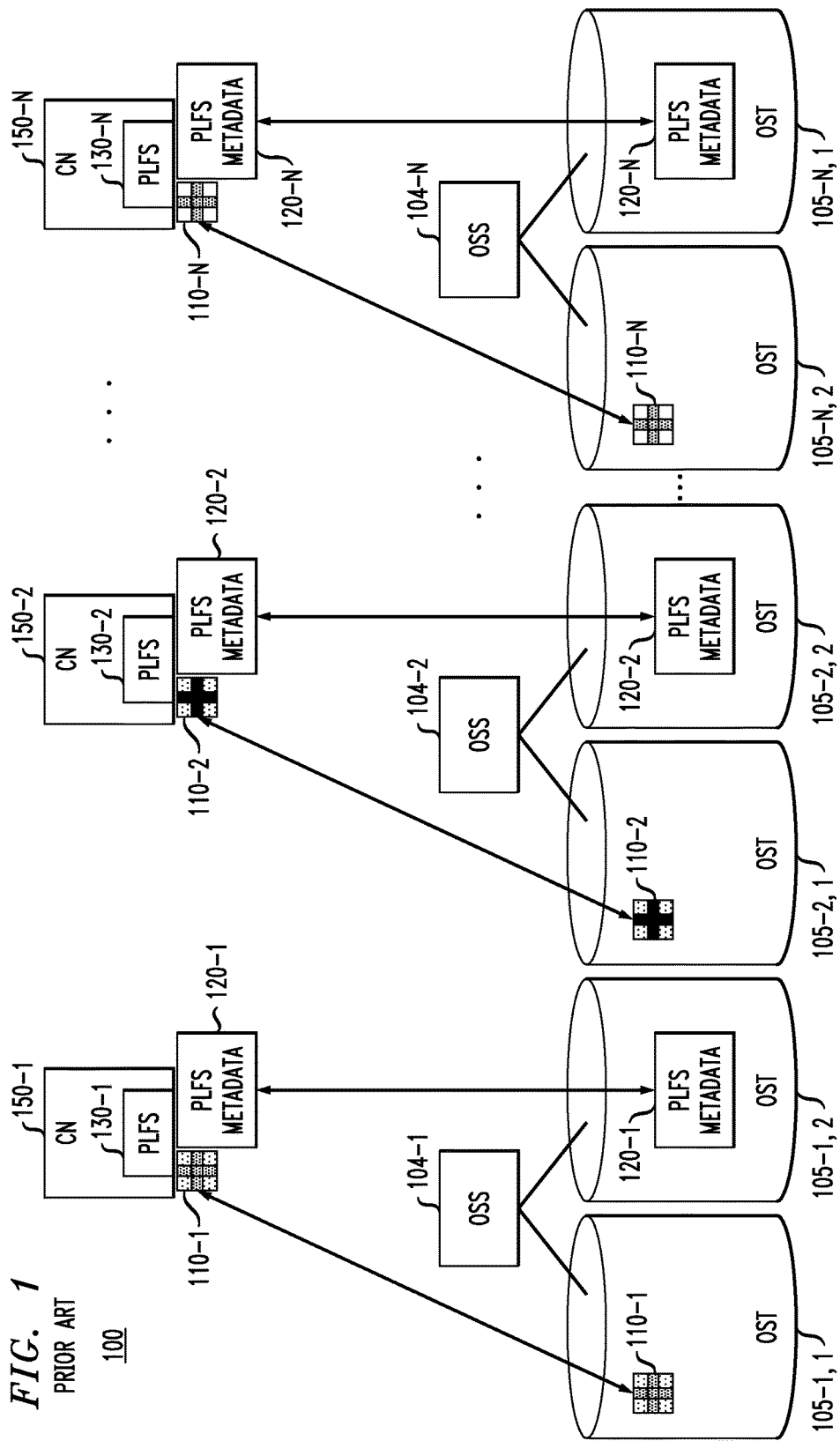
FIG. 1 is a block diagram of a conventional parallel file system in which a plurality of applications executing on a plurality of compute nodes generate a shared file.

FIG. 1 shows an exemplary conventional parallel file system 100. The exemplary parallel file system 100 comprises a plurality of compute nodes (CNs) 150 and a plurality of object storage servers 104. More particularly, the parallel file system 100 comprises N compute nodes 150 denoted 150-1 through 150-N, and object storage servers denoted 104-1 through 104-N. Each of the object storage servers 104 has one or more corresponding storage devices 105 which may comprise a storage array or other type of storage device. Thus, the exemplary object storage servers 104-1 through 104-N have associated exemplary storage devices 105-1,1 and 105-1, 2 through 105-N, 1 and 105-N, 2, respectively. The compute nodes 150 and object storage servers 104 communicate with one another, for example, over a network (not shown). The storage devices 105 are also referred to herein as object storage targets of their corresponding object storage servers 104.

One or more of the devices in FIG. 1 comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also included in one or more of the devices in FIG. 1 is network interface circuitry. The network interface circuitry allows the devices to communicate over the network with compute nodes 150 and/or object storage servers 104. The network interface circuitry may comprise, for example, one or more conventional transceivers.

The parallel file system 100 may be embodied as a parallel log-structured file system (PLFS). The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Storage arrays utilized in the parallel file system 100 may comprise, for example, storage products such as VNX™ and Symmetrix® VMAX®, both commercially available from EMC Corporation of Hopkinton, Mass. A variety of other storage products may be utilized to implement at least a portion of the object storage targets of the parallel file system 100.

The network may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 may optionally be arranged into a plurality of storage tiers, in a known manner. As noted above, each of the storage devices 105 may be viewed as being representative of an object storage target of the corresponding one of the object storage servers 104.

Also, although two object storage targets 105 are associated with each object storage server 104 in the FIG. 1 embodiment, other embodiments may associate a different number of object storage targets with each object storage server.

The parallel file system 100 may be implemented, by way of example, in the form of a Lustre file system, although use of Lustre is not a requirement of the present invention. Accordingly, servers 104 need not be configured with Lustre functionality, but may instead represent elements of another type of cluster file system.

In the parallel file system 100 of FIG. 1, a plurality of distributed applications on compute nodes 150 write data to a shared file. The object storage servers 104 and object storage targets 105 are optionally implemented as Lustre OSS and OST elements, respectively. Additional details regarding conventional aspects of an exemplary Lustre file system may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein. Additional details regarding the use of PLFS on compute nodes 150 may be found in, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

In the exemplary embodiment of FIG. 1, a given OSS 104 exposes two OSTs 105. Each of the OSTs may comprise one or more storage arrays or other types of storage devices. The total data storage capacity of the cluster file system 100 is the sum of all the individual data storage capacities represented by the OSTs 105. The compute nodes 150 can concurrently access this collective data storage capacity using data IO requests directed to the OSSs 104. The IO requests and other similar requests herein may be configured, for example, in accordance with standard portable operating system interface (POSIX) system calls.

As indicated above, PLFS is a virtual log-structured file system that allows data to be written quickly in such parallel file systems 100. PLFS is particularly useful when multiple applications on compute nodes 150 write concurrently to a shared file. One challenge, however, is that the amount of metadata required to be read data back from PLFS can be extremely large. As indicated above, in accordance with aspects of the present invention, a partitioned key-value store is employed, together with low-latency MPI communications, distributed across the user-space of compute nodes 150, to cooperatively store the PLFS metadata.

When an application on a compute node 150 writes to a shared file, a PLFS library 130 on the compute node 150 translates the write operation into a write to a given sub-file or data portion 110. The PLFS library 130 interacts with the exemplary Lustre file system and applications running on the compute nodes 150.

As shown in FIG. 1, a plurality of distributed applications on compute nodes 150 write data to a shared file. The PLFS library 130 on each compute node 150 reorganizes the data into multiple sub-file portions 110-1 through 110-N. Thus, the data can be distributed among multiple OSSs 105 and the applications on the compute nodes 150 thereby achieve better utilization of the storage system.

The PLFS library 130 also creates metadata 120-1 through 120-N associated with each corresponding data portion 110-1 through 110-N that must be stored along with the corresponding data portion 110-1 through 110-N. The metadata 120 comprises, for example, a logical offset, a physical offset, a length, a file identifier, as well as timestamps for start and end times. In addition, the PLFS library 130 on each compute node 150 must keep an image of the entire metadata 120 corresponding to all data portions 110-1 through 110-N of a given shared file. The metadata 120-1 through 120-N is also stored by the OSSs 104 on the OSTs 105.

These and other drawbacks of conventional arrangements are addressed by aspects of the present invention by providing a partitioned key-value store coupled with low-latency Message Passing Interface (MPI) communications, distributed across the user-space of compute nodes 150, to cooperatively store the PLFS metadata 120. In this manner, the PLFS metadata 120 is striped across the compute nodes 150 and then the necessary portions are read, as needed.

In one exemplary implementation, as discussed further below in conjunction with FIGS. 2 and 3, Multidimensional Data Hashing Indexing Middleware (MDHIM) is employed to stripe the PLFS metadata 120 across the compute nodes 150 and then the necessary portions are read, as needed.

Figure 2:
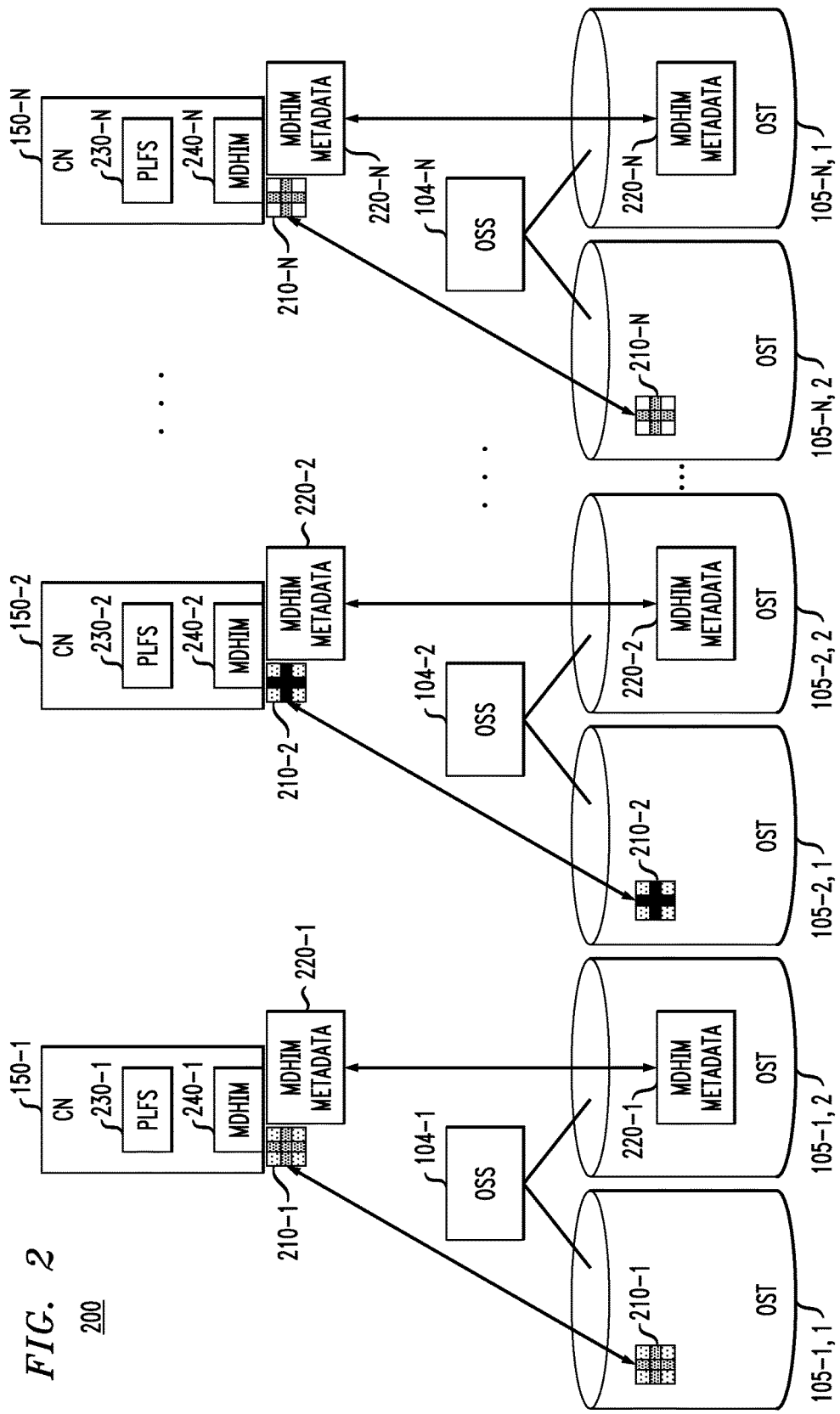
FIG. 2 is a block diagram of a parallel file system in accordance with aspects of the invention where the corresponding metadata for a plurality of data portions of a shared file is stored using a partitioned data store.

FIG. 2 illustrates a parallel file system 200 in accordance with aspects of the invention where the corresponding metadata 220 for a plurality of data portions 210-1 through 210-N of a shared file is striped across the compute nodes 150 in the parallel file system 200. As will be described, such arrangements advantageously allow for more efficient storage of metadata for a shared file in a parallel file system in a manner that requires only small changes to clients and avoids the need for any significant changes to object storage servers, or applications running on those devices.

As shown in FIG. 2, a PLFS library 230 runs on each compute node 150. Each PLFS library 230-1 through 230-N links to a corresponding MDHIM library 240-1 through 240-N which is also running on each compute node 150. When the MDHIM libraries 240 are initialized, the MDHIM libraries 240 spawn a server thread on each compute node 150. Then, as discussed further below, when a PLFS library 230 makes calls into the corresponding MDHIM library 240, it essentially becomes an MDHIM client that determines which MDHIM server on which compute node 150 has the appropriate portion of the metadata. As shown in FIG. 2, the MDHIM servers will also store their metadata 220-1 through 220-N (which is the PLFS metadata associated with the portions 210-1 through 210-N of the shared file) into the storage system.

In this manner, when an index entry (metadata) 220-i is created for a given data portion 210-i, instead of appending the index entry (metadata) 220-i to an index log, the index entry (metadata) 220-i is inserted into MDHIM. This is a library call inside PLFS 230 to the MDHIM API 240. This essentially then becomes an MDHIM client which creates a key-value pair from the index entry (metadata) 220-i in which the key is the Logical Offset and the data is the rest of metadata record. As discussed further below in conjunction with FIG. 3, the MDHIM insert code then determines which MDHIM server on which compute node 150 has the appropriate metadata and then sends a request for the desired metadata. A similar process happens on a read operation.

It should be noted with regard to the illustrative embodiment of FIG. 2 that relatively minor modifications may be made to one or more applications or other system elements or components in order to achieve additional improvements.

In this manner, shared writes are decoupled, with a similar data distribution as the conventional solution of FIG. 1, without the additional overhead created by storing an image of all of the PLFS metadata on each compute node 150. Thus, among other benefits, aspects of the present invention allow a plurality of distributed applications to write to a shared file without having the PLFS metadata compete for storage resources on the compute nodes 150. In this manner, only a portion of the PLFS metadata is stored on each compute node 150.

Generally, MDHIM is a sharded key-value store that is optimized for performance in high performance computing (HPC) and MPI environments, in a known manner. As indicated above, MDHIM has a client running on each compute node 150 and servers either running on dedicated MDHIM nodes or also running on the same compute nodes 150. Each MDHIM server serves a sub-range of the key space and each MDHIM client knows the distribution and therefore routes inserts/queries to the appropriate server. In this manner, MDHIM servers can be any simple KV (Key-Value) store since the distribution/sharding logic is done within the MDHIM clients.

For example, MDHIM can be used to store employee information, where the keys are the employee's last name and the value is any information to be stored for the employee. If there are 26 nodes available for MDHIM, an MDHIM server is created on each node, where each server is responsible for a unique first letter of the alphabet. Then, to insert or query for an employee with a last name beginning with the letter "B," the MDHIM client running on the compute node 150 will send the insert/query request to the second MDHIM server since that server is responsible for the letter B.

For a more detailed discussion of Multidimensional Data Hashing Indexing Middleware (MDHIM), see, for example, http://sourceforge.net/projects/mdhim/, incorporated by reference herein.

FIG. 3 illustrates exemplary pseudo code 300 for interactions between the PLFS libraries 230 and the MDHIM libraries 240. Generally, the pseudo code 300 shows how the PLFS libraries 230 use the MDHIM libraries 240 to achieve a partitioned storage of the metadata 220.

When the PLFS library 230 wants to open or create metadata 220, it interacts with the MDHIM library 240 to create the corresponding containers.

Generally, the PLFS libraries 230 write an index entry for the metadata 220 corresponding to an individual data portion 210 by executing a write operation, as follows:

Write offsets/length/container_id to MDHIM Index which will append the index entry for the metadata 220 to the appropriate container for the shared file.

Generally, the PLFS libraries 230 can query the MDHIM Index for the real location of the offset for a read( ) request. This triggers the MDHIM library 240 to open the appropriate container for the shared file and to obtain the data based on the offset.

FIG. 4 illustrates exemplary pseudo code 400 for a PLFS open read operation. As shown in FIG. 4, the exemplary pseudo code 400 initially performs conventional PLFS operations such as ensuring that the indicated file exists, with the appropriate permissions. Thereafter, the exemplary pseudo code 400 initializes MDHIM and has MDHIM read in the data logs that contain the PLFS metadata 220 that PLFS stored into MDHIM when the file was written.

FIG. 5 illustrates exemplary pseudo code 500 for a PLFS open write operation. As shown in FIG. 5, the exemplary pseudo code 500 initially performs conventional PLFS operations such as creating the top level container. Thereafter, the exemplary pseudo code 500 initializes MDHIM.

FIG. 6 illustrates exemplary pseudo code 600 for a PLFS read operation. As shown in FIG. 6, the exemplary pseudo code 600 operates in a similar manner as a conventional PLFS read operation, using MDHIM (instead of the existing PLFS index) to build the set of read tasks.

An existing implementation for a PLFS read operation is discussed, for example, at https://github.com/plfs/plfs-core/blob/2.4/src/LogicalFS/PLFSIndex.cpp, incorporated by reference herein.

FIG. 7 illustrates exemplary pseudo code 700 for a PLFS find_read_tasks operation. Generally, the PLFS find_read_tasks operation reconciles the particular MDHIM server that stores the metadata of interest, using the mdhim_query function. Generally, given an offset, the mdhim_query identifies the MDHIM server storing the metadata of interest.

FIG. 8 illustrates exemplary pseudo code 800 for a PLFS write operation. As shown in FIG. 8, the exemplary pseudo code 800 operates in a similar manner as a conventional PLFS write operation by initially making an index entry. Then, rather than writing the index entry to the index log, the modified PLFS write operation performs an MDHIM insert operation to store the metadata.

FIG. 9 illustrates exemplary pseudo code 900 for a PLFS close operation. As shown in FIG. 9, the exemplary pseudo code 900 operates in a similar manner as a conventional PLFS close operation. Then, rather than synching and closing the indexlog, the modified PLFS close operation performs an MDHIM flush operation to save the MDHIM data to storage.

The exemplary pseudo code described herein shows mdhim being initialized and finalized for each plfs file. In one variation, mdhim can be initialized and finalized only once per PLFS instance and the new tables are used for each file instead of a new MDHIM instance for each. This would reduce the amount of work required to set up the MDHIM servers since it is performed only once.

It is noted that there need not be separate plfs_write_open and plfs_read_open calls, as discussed herein for illustrative purposes.

It is to be appreciated that the particular operations and associated messaging illustrated in FIGS. 2 through 9 are exemplary only, and numerous other types of operations and messaging may be used in other embodiments. It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the parallel file system 200. Such components can communicate with other elements of the parallel file system 200 over any type of network or other communication media.

As indicated previously, components of a compute node 150 having an exemplary PLFS-MDHIM interface as disclosed herein can be implemented at least in part in the form of one or more software programs stored in memory and executed by a processor of a processing device. A memory having such program code embodied therein is an example of what is more generally referred to herein as a "computer program product."

The parallel file system 200 or portions thereof may be implemented using one or more processing platforms each comprising a plurality of processing devices. Each such processing device may comprise, for example, processor, memory and network interface components.

As indicated above, parallel file system functionality such as that described in conjunction with FIGS. 2 through 9 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from the shared file write functionality as described herein. Also, the particular configurations of system and device elements shown in FIG. 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a compute node of a parallel file system;
   the compute node being configured to communicate with a plurality of object storage servers and with a plurality of other compute nodes over a network, wherein a plurality of applications executing on said plurality of compute nodes generate a shared file;
   the compute node further configured to implement a Parallel Log Structured File System (PLFS) library to store at least one portion of said shared file generated by an application executing on said compute node and PLFS metadata for said at least one portion of said shared file on one or more of said plurality of object storage servers, wherein said PLFS metadata for said at least one portion of said shared file comprises a key-value pair having a key based on a logical offset of said at least one portion of said shared file;

the compute node further configured to implement a partitioned key-value data store for storing a partition of said PLFS metadata for said shared file, wherein said partitioned key-value data store communicates with partitioned key-value data stores on said other compute nodes using a message passing interface to cooperatively store the PLFS metadata, wherein said partition comprises a given sub-range of a key space for said PLFS metadata, wherein said key-value pair for said PLFS metadata for said at least one portion of said shared file is inserted into a corresponding one of said partitions stored by a respective partitioned key-value data store as a new key-value record based on said key when said at least one portion is written to said shared file; and the compute node being implemented utilizing at least one processing device coupled to a memory.

2. The apparatus of claim 1 wherein said PLFS library communicates with said partitioned key-value data store using function calls.

3. The apparatus of claim 1 wherein said PLFS metadata for said shared file is sharded across said partitioned key-value data store.

4. The apparatus of claim 1 wherein each of the object storage servers is configured to interface with at least one object storage target.

5. The apparatus of claim 1 wherein the partitioned key-value data store is configured to process one or more metadata requests when one or more of said plurality of applications executing on said compute nodes performs a read operation on said shared file.

6. The apparatus of claim 1 wherein the partitioned key-value data store is implemented using Multidimensional Data Hashing Indexing Middleware (MDHIM).

7. The apparatus of claim 6 wherein one or more MDHIM clients run on each of said compute nodes and communicate with a plurality of MDHIM servers in said parallel file system.

8. The apparatus of claim 7 wherein each of said plurality of MDHIM servers store a given partition of said PLFS metadata for said shared file comprising said sub-range of said key space for said PLFS metadata for said shared file.

9. The apparatus of claim 8 wherein a given MDHIM server storing a particular sub-range of said PLFS metadata is contacted to read or write PLFS metadata within said sub-range.

10. The apparatus of claim 1 wherein the parallel file system comprises a Lustre file system.

11. A processing platform comprising a plurality of processing devices and the apparatus of claim 1.

12. A method comprising:

configuring a compute node of a parallel file system to communicate with a plurality of object storage servers and with a plurality of other compute nodes over a network, wherein a plurality of applications executing on said plurality of compute nodes generate a shared file; and configuring the compute node to implement a Parallel Log Structured File System (PLFS) library to store at least one portion of said shared file generated by an application executing on said compute node and PLFS metadata for said at least one portion of said shared file on one or more of said plurality of object storage servers, wherein said PLFS metadata for said at least one portion of said shared file comprises a key-value pair having a key based on a logical offset of said at least one portion of said shared file; and configuring the compute node to implement a partitioned key-value data store for storing a partition of said PLFS metadata for said shared file, wherein said partitioned key-value data store communicates with partitioned key-value data stores on said other compute nodes using a message passing interface to cooperatively store the PLFS metadata, wherein said partition comprises a given sub-range of a key space for said PLFS metadata, wherein said key-value pair for said PLFS metadata for said at least one portion of said shared file is inserted into a corresponding one of said partitions stored by a respective partitioned key-value data store as a new key-value record based on said key when said at least one portion is written to said shared file;

the compute node being implemented utilizing at least one processing device coupled to a memory.

13. The method of claim 12 wherein said PLFS library communicates with said partitioned key-value data store using function calls.

14. The method of claim 12 wherein said PLFS metadata for said shared file is sharded across said partitioned key-value data store.

15. The method of claim 12 further comprising the step of configuring each of the object storage servers to interface with at least one object storage target.

16. The method of claim 12 further comprising the step of configuring the partitioned key-value data store to process one or more metadata requests when one or more of said plurality of applications executing on said compute nodes performs a read operation on said shared file.

17. The method of claim 12 wherein the partitioned key-value data store is implemented using Multidimensional Data Hashing Indexing Middleware (MDHIM).

18. The method of claim 17 wherein one or more MDHIM clients run on each of said compute nodes and communicate with a plurality of MDHIM servers in said parallel file system.

19. The method of claim 18 wherein each of said plurality of MDHIM servers store a given partition of said PLFS metadata for said shared file comprising said sub-range of said key space for said PLFS metadata for said shared file.

20. The method of claim 19 wherein a given MDHIM server storing a particular sub-range of said PLFS metadata is contacted to read or write PLFS metadata within said sub-range.

21. A computer program product comprising a processor-readable storage medium having encoded therein executable code of one or more software programs, wherein the one or more software programs when executed perform the steps of the method of claim 12.

22. A parallel file system comprising:

a plurality of compute nodes; and a plurality of object storage servers;

one of the plurality of compute nodes being configured to communicate with said plurality of object storage servers and with others of said plurality of compute nodes over a network, wherein a plurality of applications executing on said plurality of compute nodes generate a shared file;

the one compute node further configured to implement a Parallel Log Structured File System (PLFS) library to store at least one portion of said shared file generated by an application executing on said one compute node and PLFS metadata for said at least one portion of said shared file on one or more of said plurality of object storage servers, wherein said PLFS metadata for said at least one portion of said shared file comprises a key-value pair having a key based on a logical offset of said at least one portion of said shared file;

the one compute node further configured to implement a partitioned key-value data store for storing a partition of said PLFS metadata for said shared file, wherein said partitioned key-value data store communicates with partitioned key-value data stores on said other compute nodes using a message passing interface to cooperatively store the PLFS metadata, wherein said partition comprises a given sub-range of a key space for said PLFS metadata, wherein said key-value pair for said PLFS metadata for said at least one portion of said shared file is inserted into a corresponding one of said partitions stored by a respective partitioned key-value data store as a new key-value record based on said key when said at least one portion is written to said shared file; and the one compute node being implemented utilizing at least one processing device coupled to a memory.

23. The parallel file system of claim 22 wherein the partitioned key-value data store is implemented using Multidimensional Data Hashing Indexing Middleware (MDHIM).

24. The parallel file system of claim 23 wherein one or more MDHIM clients run on each of said compute nodes and communicate with a plurality of MDHIM servers in said parallel file system, wherein each of said plurality of MDHIM servers store a given partition of said PLFS metadata for said shared file comprising said sub-range of said key space for said PLFS metadata for said shared file.

25. The parallel file system of claim 24 wherein a given MDHIM server storing a particular sub-range of said PLFS metadata is contacted to read or write PLFS metadata within said sub-range.

* * * * *